Oct. 10, 1933.                A. R. LAMBERT                1,929,501
                                  WHEEL
                            Filed April 22, 1926
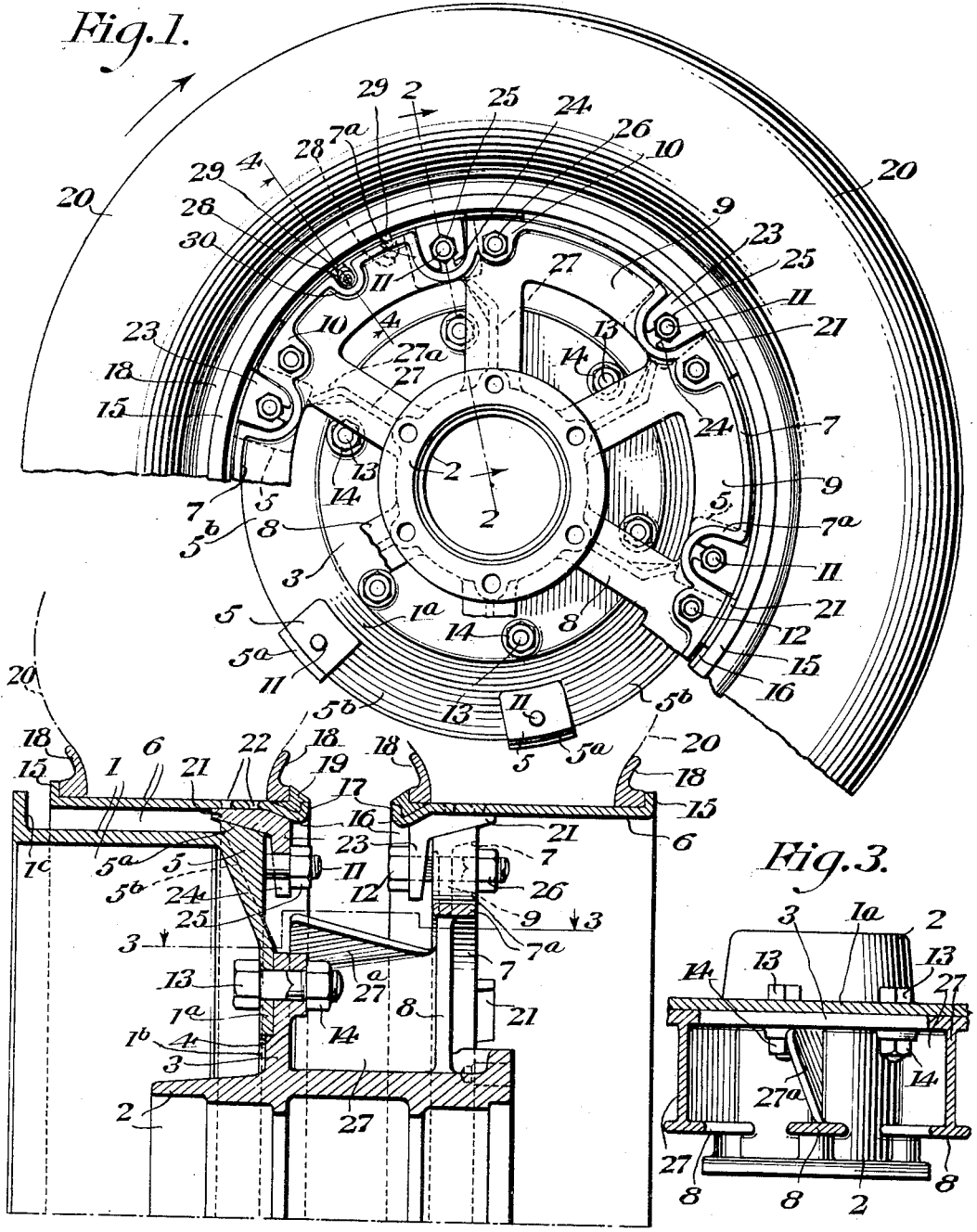
INVENTOR
Alvan R. Lambert
BY
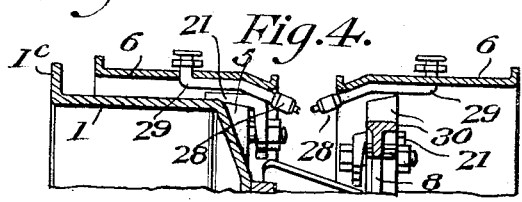
ATTORNEYS Patented Oct. 10, 1933

1,929,501

UNITED STATES PATENT OFFICE 1,929,501

WHEEL

Alvan R. Lambert, Hollywood, Calif., assignor, by mesne assignments, to Burnett Walker, New York, N. Y.

Application April 22, 1926. Serial No. 103,869

1 Claim. (Cl. 301—13)

This invention relates to improvements in wheels, and more particularly to pneumatic-tired wheels for use on automobiles and the like.

The invention has for its main objects, to provide a wheel of the class set forth of light and inexpensive construction; to provide a combined wheel and brake drum; to provide a simple and efficient form of dual-tire wheel; to provide a pneumatic-tired wheel constructed and arranged to effect air-cooling of the tire-supporting means; to provide a combined wheel and brake unit in which a tire-carrying rim is demountably supported on the brake drum; and to provide a dual-tire metal wheel wherein one tire carrier is supported on the wheel body and the other tire carrier is supported on a brake drum attached to the wheel body. Other objects of the invention will appear from the description in detail of the preferred embodiment of the invention illustrated in the accompanying drawing.

In the drawing, Figure 1 is a side view, partly broken away, of a dual-tire wheel embodying the invention, as said wheel apears when viewed from the outer face thereof;

Fig. 2 is a section on the line 2—2 of Fig. 1;

Fig. 3 a section on the line 3—3 of Fig. 2; and

Fig. 4 a detail section on the line 4—4 of Fig. 1.

The wheel body is formed in two sections one of which includes a steel brake drum 1 and the other one of which consists of a single steel casting comprising a hub 2 provided near its inner end with integral brake-drum-supporting means, and near its outer end with integral tire-rim-supporting means. The drum-supporting means comprises a circumferential flange or web 3 extending around hub 2 in a plane perpendicular to the axis of the hub and having its inner face countersunk to form an annular shoulder 4 forming a seat for the outer head 1$^a$ of brake drum 1, said drum head having a central aperture 1$^b$ through which the inner end of the hub extends. The edge of aperture 1$^b$ seats on the annular shoulder 4 formed on the flange 3.

The drum 1 is provided at its inner end with the usual flange 1$^c$ projecting radially outward from the drum. To adapt the apertured drum head to function as a support for a tire-carrying rim, said head is thickened to provide a circular rim-supporting portion 5 having its periphery shaped to form a frusto-conical rim-supporting seat 5$^a$ at the outer end of the drum. The edge of said seat 5$^a$ of greatest diameter is arranged nearest the inner face of the wheel, and the diameter of said seat at said edge is greater than the maximum diameter of the main annular body portion of the drum, as shown.

Said seat 5$^a$ is preferably interrupted at intervals by transverse depressions 5$^b$ to reduce the amount of metal and provide air passages of maximum size between the drum and a tire rim supported on said seat. An annular series of stud bolts 11 project outward horizontally from the thickened portion 5 of the drum head between depressions 5$^b$. The seat 5$^a$ forms a support for the inner one of the two tire-carrying rims 6, and bolts 11 form part of the rim-holding means. Drum 1 is detachably held to hub web 3 by bolts 13 and nuts 14.

The frusto-conical support 7 for the second or outer tire-carrying rim 6 comprises a continuous frusto-conical flange of the same width and same edge diameters as seat 5$^a$. The support 7 is arranged in reverse relation with respect to support 5, i. e. its conoidal surface slopes toward the inner face of the wheel. The support or flange 7 is supported on a web and spoke structure cast integral with the hub 1 and flange 7 and comprises a series of flat spokes 8 radiating from hub 1 and connected at their outer ends by arcuate web portions 9. The spokes and web portions 9 lie edgewise in a plane perpendicular to the axis of the hub and, as shown, join with flange 7 adjacent the inner edge of the flange. A boss 10 is formed on the outer face of each spoke 8 immediately under the flange 7, the outer face of this boss being flush with the plane of the outer edge of the flange, and the thickened spoke end thus formed is provided with a bolt hole (preferably square) for receiving one of an annular series of bolts 12. Bolts 12 form part of the holding means for the outer tire-carrying rim 6, and the unthreaded shank portions of said bolts which engage in the bolt holes in the thickened spoke ends are preferably square in cross section.

The two tire-carrying rims are of identical size and construction and are interchangeable. Except for the supporting and retaining devices carried thereby, and hereinafter described, each rim is of well-known standard construction, having its main annular body portion provided with the usual upturned flange 15 along one edge, the usual depressed channel portion 16 adjacent its opposite edge and the usual upturned flange 17 along said opposite edge, and the usual pair of tire-shoe engaging rings 18 and locking ring 19 all co-operating with flanges 15 and 17 to hold an ordinary pneumatic tire 20 on the rim.

For supporting and holding the rim 6 on either support 5 or support 7, an annular series of wedges 21 are rigidly secured (as by countersunk rivets 22) to the inner surface of the rim just inside of the channel portion 16, said wedges extending transversely of the rim and tapering toward the flanged edge 15 of the rim. The inclined inner faces of the wedges 21 are preferably slightly curved transversely of the wedges to conform to the curve of the periphery of supports 5 and 7. Each wedge 21 is preferably formed with an integral lug 23 at its outer end extending radially inward with respect to the rim substantially in the plane of the depressed channel portion 16 of the rim. Lugs 23 are formed with slots 24 for receiving either the stud bolts 11 or the bolts 12.

The manner of assembling the tire-carrying rim portions of the wheel on the wheel body will be now described. The rim with its tire thereon to be mounted on support 5 is presented at the outer face of the wheel with the flanged edge 15 of the rim innermost and the wedges 21 and lugs 23 in register with depressions 7a formed in flange 7 adjacent bosses 10 on the spokes 8 and in register with stud bolts 11. The depressions afford clearance for the wedges and lugs permitting the rim to be slipped over flange 7 and finally about support 5 until the wedges tightly grip the periphery of said support with stud bolts 11 extending through slots 24 in wedge lugs 23. Nuts 25 are then screwed on the stud bolts tightly up against lugs 23. The rim with its tire thereon to be mounted on flange 7 is then presented at the outer face of the wheel with its flanged edge 17 innermost and the wedges 21 and lugs 23 in register with depressions 7a. The rim is passed inwardly about the flange 7 far enough to pass lugs 23 inside the flange, whereupon the rim is rotated until lugs 23 register with bosses 10, and is then drawn outward until the wedges tightly grip flange 7. Bolts 12 are then passed outward through slots 24 in the lugs 23 and through the bolt holes which are formed in the bosses 10 and the spoke ends on which said bosses are formed. Nuts 26 are then screwed on bolts 12 firmly up against bosses 10. To remove the rims with their tires the procedure just described is reversed.

It is well known that in use vehicle brake drums and the tire-carrying rims and tires frequently become heated to such an extent as to result in injury to, or destruction of, brake elements and tires. To avoid this, means are provided for automatically circulating air over the inner surfaces of the rims and about the brake drum and tires when the wheel is in motion. This means comprises a series of impeller blades radiating from the hub and cast integrally with said hub and flange 3 and spokes 8. One of these blades 27 lies in a radial plane between web 3 and each spoke 8, preferably back of the leading edge of the spoke, and has its tip portion 27a bent counterclockwise out of said plane and extending progressively higher toward its inner edge. This arrangement provides a combined wheel body and centrifugal fan which forces air inwardly and radially toward the space between the two tires 20 and also toward the passages defined by the depressed portions 5b of support 5 and the rim 6 on said support between wedges 21, so that air is forced out between the tires and also through said passages and to the atmosphere through the annular space between drum 1 and the surrounding rim 6. Flange 1c on drum 1 diverts this current radially past the inner side of the inner tire 20. The forced draft set up by the fan draws air axially inward around the outer side of the outer tire, through the outer rim and the openings between spokes 8, and also through the passages defined by flange 7 and the rim supported thereon and the wedges 21.

To afford clearance for the usual air valve 28 and the usual air-valve-carrying tube 29 of each tire 20 in assembling and removing said tires with their carrying rims 6, the flange 7 is provided with a depression 30 generally similar to depressions 7a.

While I have shown one particular form of dual-tire wheel, it will be obvious that my invention is not limited to the particular construction illustrated, and, further, that certain features of the invention may be employed in wheels having but a single tire.

By providing cone-wedge rim supports on the wheel body, reversely arranged as shown and employing two reversely arranged, identically formed rims with wedges similarly arranged and located on said rims, it will be obvious that I may arrange the supports close together axially of the wheel and still be able to mount thereon either narrow or wide rims, as the distance between the adjacent edges of the rims is constant irrespective of the width of the rims.

What I claim is:

In a wheel, an inner felly having a frusto-conical peripheral portion arranged with the smaller end outwardly, stud bolts projecting outwardly from the outer face of the portion of the felly adjacent said frusto-conical portion, a rim surrounding the periphery of the felly, angled lugs having wedge portions fitting between said rim and said frusto-conical portion, said lugs having forked portions straddling said bolts, nuts on the outer ends of said bolts securing the lugs in position, an outer felly having a peripheral flange provided with frusto-conical outer surface portions arranged with the large ends outward, said felly having an annular web extending from the flange adjacent its inner end toward the axis of the wheel, said flange having spaced portions of U-shape extending inwardly from the frusto-conical portions and thereby forming spaced peripherally opening slots, said slots being located opposite the stud bolts of the first felly, bosses on the outer face of the web in the angles between the U-shaped and frusto-conical portions of the flange, said bosses having their outer faces flush with the outer edge of the flange, angled lugs resting on the frusto-conical portions of the outer felly, bolts passing through said bosses and last-mentioned lugs, and an outer rim resting on said last-mentioned lugs.

ALVAN R. LAMBERT.